Figure 1:
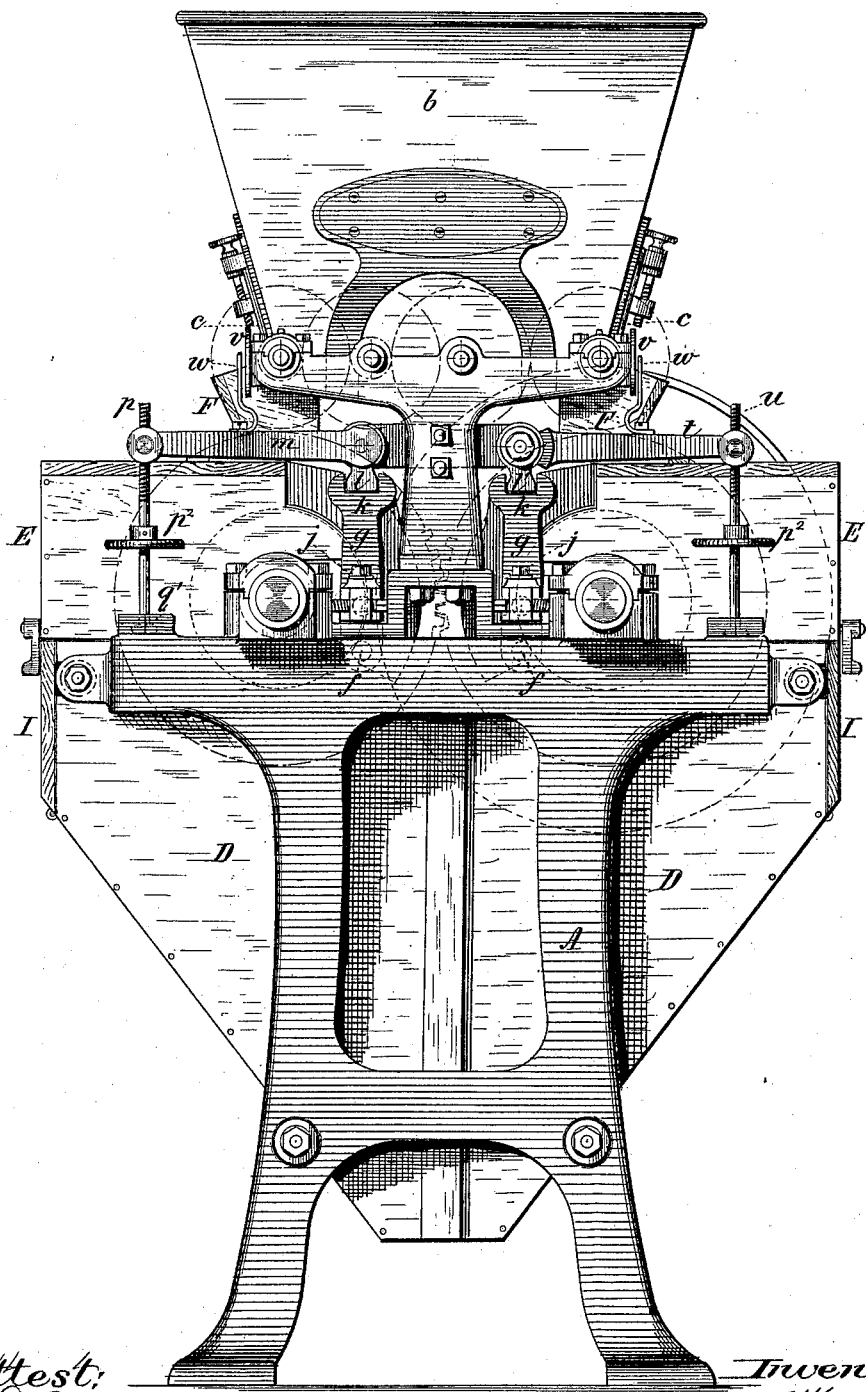

F. WEGMANN.
Machine for Grinding, Granulating, and Treating Wheat and Bran.

No. 212,774. Patented Feb. 25, 1879.

F. WEGMANN.
Machine for Grinding, Granulating, and Treating Wheat and Bran.

No. 212,774. Patented Feb. 25, 1879.

Attest:
H. L. Perrine
Floyd Norris

Inventor.
pro Federigo Wegmann
Johnson & Johnson
Atty's

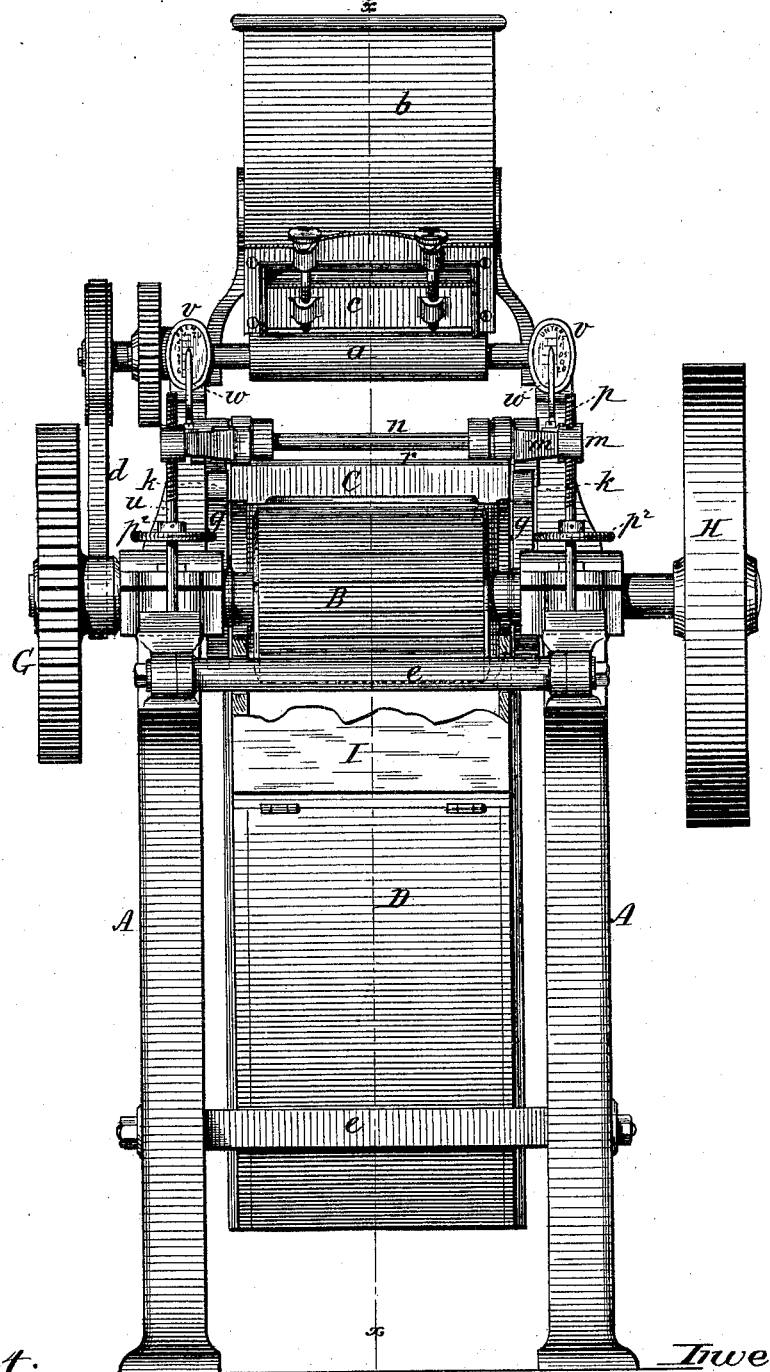

UNITED STATES PATENT OFFICE.

FEDERIGO WEGMANN, OF NAPLES, ITALY.

IMPROVEMENT IN MACHINES FOR GRINDING, GRANULATING, AND TREATING WHEAT AND BRAN.

Specification forming part of Letters Patent No. 212,774, dated February 25, 1879; application filed August 26, 1878; patented in England, February 9, 1878.

*To all whom it may concern:*

Be it known that I, FEDERIGO WEGMANN, of Naples, in the Kingdom of Italy, have invented certain new and useful Improvements in Machinery for Grinding, Granulating, Crushing, and Treating Wheat and Bran; and I do hereby declare that the following is a full, clear, and exact description of the invention, which will enable others skilled in the art to which it appertains to make and use the same, reference being had to the accompanying drawings, and to letters of reference marked thereon, which form a part of this specification.

In United States patents granted to me September 12, 1876, reissued July 31, 1877, No. 7,825, and January 22, 1878, No. 199,605, I have described my invention for preparing and treating middlings or meal by crushing-rolls having smooth or unbroken surfaces of porcelain and silica, or equivalent silicious substances, and arranged in pairs, to increase the yield and improve the quality of the flour.

The invention herein is for grinding and granulating wheat by china or porcelain grooved rolls, in connection with china or porcelain grooved segments having adjustments at all points in relation to the roll, preparatory to the operation of crushing the middlings and of separating the flour from the bran, as in my said patents.

In practice, the grinding and granulating machine herein described is combined for use with a series of machines in such manner that the various processes to which the grain and the middlings are subjected are carried on by a continuous operation, so that it is not required to handle any of the material after being placed in the first machine until it is finished for use as different qualities of flour and bran.

By the use of porcelain rolls and segments about half the power is saved usually required for grinding wheat, and the lower quality of flour is reduced about one-half. By this continuous system of porcelain grinding, granulating, crushing, and separating surfaces, the flour retains its original chemical qualities contained in the wheat, as no heat is necessarily produced during the grinding, crushing, and separating operations, giving better and more reliable results in the quality and quantity of the products, and greatly improving the baking qualities of the flour.

The china or porcelain rolls and the china or porcelain segments are provided with rectilinear or diagonal grooves or cutting-edges adapted to the requirements of the grinding and granulating operation, and the porcelain segments are so connected to the main frame of the machine, above the top and near the bottom of the rolls, by a system of carrying and adjusting levers and turning screws, that their working-surfaces may be adjusted at their upper and at their lower edges separately or together and at each end in relation to the rolls, and especially in a manner to bring the lower edge of the segment closer to the roll than its upper edge to suit the required treatment of the grain or stuff.

I consider this varied capacity for adjustment of the porcelain segment one of the most important features of the machine, because, in the grinding and granulating process, the distance of the segment from the roll must be regulated nearer to the bottom than the top of said roll; and in order that such adjustments may be effected with the greatest exactness and made apparent to the attendant, the regulating-screws and the adjusting-levers are combined with separate indicators adapted to mark the distance of the segment from the roll at the top and at the bottom.

Figure 2:
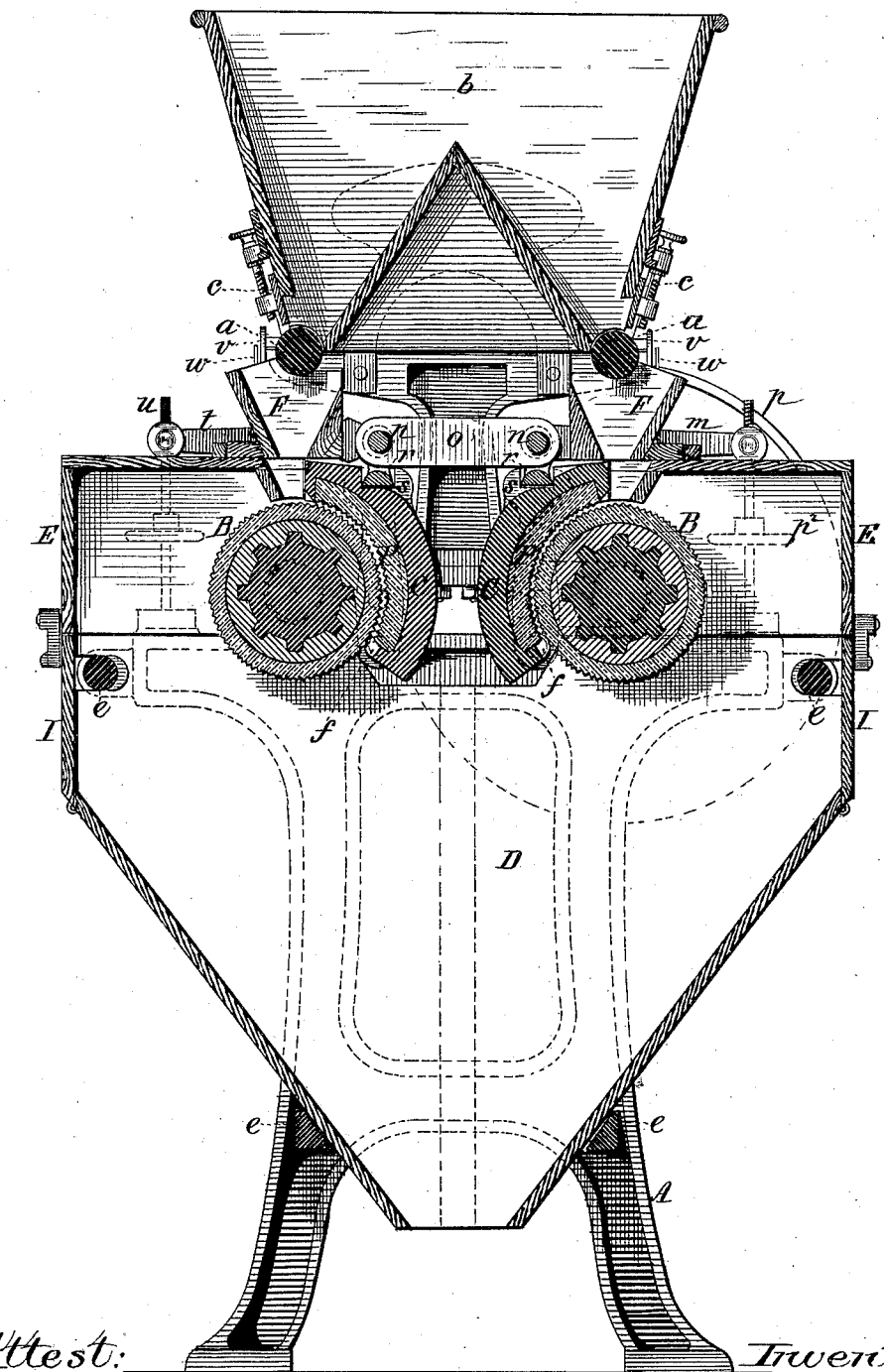
Figure 3:
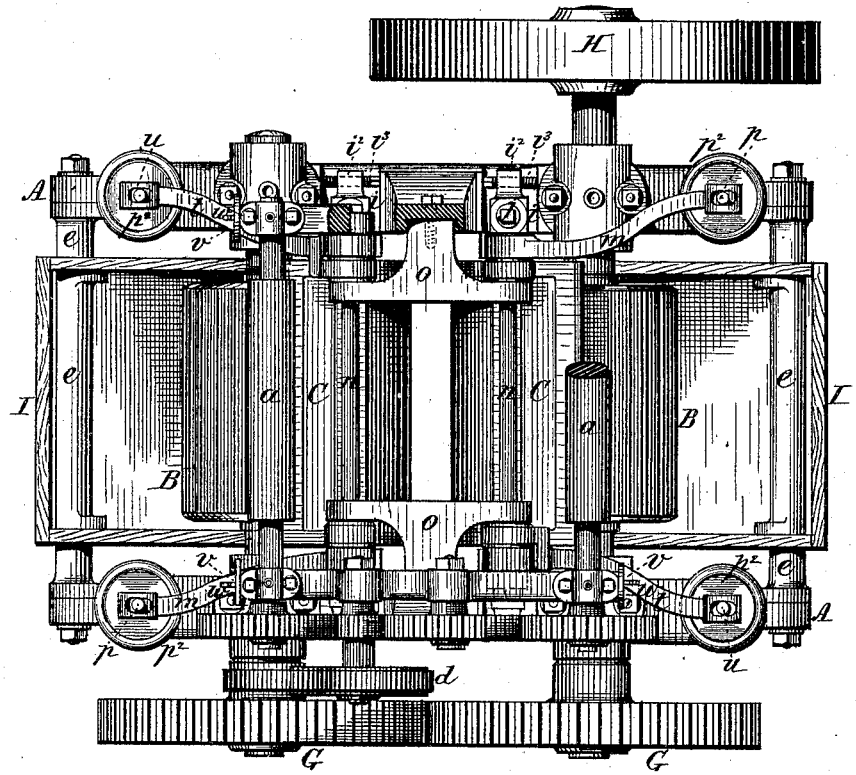
Figure 5:
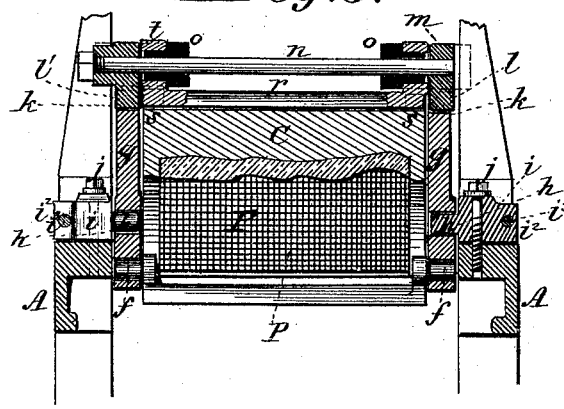
Figure 6:
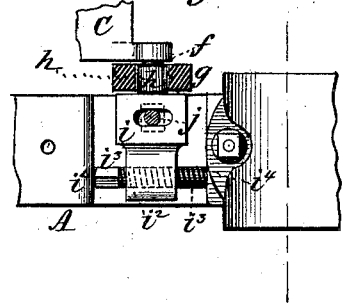
Figure 7:
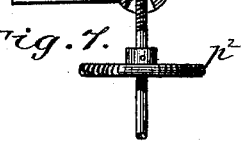

Referring to the drawings, Figure 1 represents a side elevation of a machine embracing my invention; Fig. 2, a vertical section of the same; Fig. 3, a top view, the feeding and distributing hopper being removed to show the arrangement and connection of the adjusting-levers on each side of the machine; Fig. 4, an end elevation; Fig. 5, a cross-section taken through the pivots of one of the segments and its connections with the adjusting-levers; Fig. 6, an enlarged detail of the device for giving the end adjustment of the segment, and Fig. 7 a detail of the lever-adjusting screw.

The machine consists, essentially, of two parts, the upper part, consisting of the centrally-divided supply-hopper and double feeding arrangement, and the lower part, in which the operation of grinding is effected.

The feeding arrangement is the same as that described and shown in my said patents, and in which the feeding-rolls $a\ a$ are of porcelain, and serve to equally distribute the grain through the openings at the opposite ends of the divided hopper $b$, lead it over the grinding-rolls below, and regulate its feed from said hopper by the slides $c$, controlled by thumb-screws. These feeding-rolls are connected by gear, so as to be revolved outward simultaneously by a belt, $d$, from one of the grinding-roll shafts. This feeding arrangement, however, may be varied, but is preferred on account of its simplicity and efficiency.

The grinding-rolls and segments are arranged so as to form a double mill, one set operating at each opposite end of the frame, which consists of two side frames, A A, by preference of metal, rigidly connected by cross-castings $e$, fastened by wrought-iron bolts running through them. The rolls are supported in self-lubricating bearings on the tops of the side frames, and they are arranged in positions to receive the grain from the opposite independent feed-rolls above.

The rolls B B are formed of china or porcelain and the proper proportion of silicate to give them the required hardness and durability; and the shafts or cores of the rolls have suitably-prepared beds for holding the porcelain coating, such as that described in my said patent of 1878, or other suitable construction answering the purpose and giving the desired results of fixing the porcelain or china upon a non-conducting bed. The rolls are exactly turned with black diamonds or other suitable tools, and their surfaces afterward grooved or cut with edges of the proper form, depth, and fineness, adapted to the requirements of the grinding operation. The rolls are geared to revolve inward—that is, toward the porcelain segments, which are arranged with their backs toward each other at the middle of the machine. These segments consist of a cast-iron shell, C, having its concave side hollow or recessed to form a confining bed or seat for the china or porcelain P, which is cast therein and turned to bring its concave surface exactly corresponding to the diameter of the roll, and then grooved or cut with edges similar to or the same as those of the porcelain roll, to form the grinding-surface.

The rolls are about ten inches long and eight inches in diameter, more or less, to suit the requirements, and the porcelain segments are made to cover about one-quarter of the circumference of the rolls. These segments are mounted and connected to the frame in a peculiar manner, for adjustment at different points in relation to the rolls. The segments have no direct connection with the frame at any point, but are supported upon horizontal pivot-pins $f\ f$, projecting outward from its lower corners into corresponding openings in the lower ends of two vertical metal arms, $g\ g$, which are, in turn, mounted upon horizontal trunnions $k\ k$, projecting inward from metal blocks $i\ i$, secured by vertical screws $j\ j$ upon the main frame, in such manner that the inward-projecting trunnions $h\ h$ will be above and in vertical line with the segment-corner pivots. The trunnion-blocks $i\ i$ have each an outward-projecting horizontal arm, $i^2$, through which passes a horizontal screw, $i^3$, with its ends abutting against fixed parts $i^4$ of the frame, as seen in Fig. 6, so that when turned it is prevented from moving endwise, and must therefore move the trunnion-block by a slot upon its vertical clamping-screw $j$, for a purpose to be presently stated.

Such is the connection of the lower side of the segment to the frame.

The arms $g\ g$ rise to the top of the segment and receive in their notched ends $k\ k$, Fig. 1, downward-projecting thumbs $l\ l'$, Fig. 5, one of which, $l$, is carried by a horizontal lever, $m$, fixed on the end of a horizontal cross-rod, $n$, on the opposite end of which the other thumb-projection, $l'$, is fixed, so that both thumbs extend in line, move together, and interlock with the notches of the pivoted arms below the axis of the cross-rod. The cross-rods $n\ n$ of both porcelain segments are mounted in bracket-bearings $o\ o$, Fig. 3, bolted to the inner sides of the top frames. The outer end of the lever $m$ connects with a vertical screw-stem, $p$, by a female screw-plug, $q$, Fig. 7, fitted in the end of said lever, and the lower end of said screw-stem is held by a button termination, $q'$, Fig. 1, fitted in a box on the frame, so that it has no endwise movement.

From this construction it will be seen that the segment pivoted at its lower side has its lower side controlled in its adjustment and relation to the roll by lever-connections above the top of said segment. The turning of the vertical screw-stem $p$ to the right, by means of the thumb-wheel $p^2$, will depress the lever $m$, and moving the thumb-projections $l\ l'$ back in the arc of a circle of which the axis of the cross-rod $n$ is the center will, by their interlocking connection, carry the upper ends of the arms $g\ g$ back, turning them upon their trunnions $h\ h$, and cause their lower ends to move forward, bringing the segment pivoted thereto nearer the roll. The reverse adjustment of this screw-stem carries the segment away from the roll.

Separate and independent devices serve to connect the upper side of the segment with the frame. These consist of a cross-bar, $r$, hanging by ring-bearings from the cross-rod $n$ and fitting into and interlocking with notches $s$, Fig. 2, formed in projections from the upper side of the segment. The end of this hanging bar $r$ opposite to the lever $m$ has a similar lever, $t$, projecting horizontally and connected with a vertical screw-stem, $u$, in the same manner as the said lever $m$, so that turning the screw-stem $u$ to the right will depress the lever $t$, and turning back the hanging bar $r$ in the arc of a circle of which the cross-rod $n$ is the axis will move the upper side of the segment by its interlocking connection away from the roll. A reverse adjustment of the screw-stem $u$ will bring the upper side of the segment nearer its roll by turning it upon its corner pivots $f f$. In this way the segment can be adjusted at the top and at the bottom an equal distance from the rolls, or to bring the lower side closer to the roll than the upper side, while, by means of the trunnion-blocks $i\ i$ and their adjusting-screws $i^3$, the ends of the segment can be adjusted and set in the desired relation to the roll by moving said slotted blocks $i\ i$ upon their clamping-screws $j\ j$, thus giving the porcelain segment the desired set at every point and the capacity for adjustment to suit different kinds and size of grain and the required treatment. This capacity for giving such varied adjustment to the porcelain segment is of great importance to maintain the proper relation of the working-surfaces.

The adjusting-levers are arranged at each side of the machine, and while both are connected with the segment above its top they are separate and distinct in their functions, one controlling the adjustment of the lower side of the segment and the other its upper side.

Indicating-scales $v$ are affixed to the frame of the feeding part, and pointers $w$ rise from the levers in front of said scales to mark the distance of the segment from the roll at the top and at the bottom, and the proper adjustments are determined by experience in using the machine with different qualities and toughness of wheat.

A wooden casing, D, secured between the side frames A A, serves to receive the meal from the rolls and to exclude the dust. The rolls are covered by separate casings E, provided with hoppers F, to receive the grain from the top feeding arrangement and conduct it between the rolls and the segments. The rolls are geared for simultaneous motion by equal gear-wheels G G at one side of the frame, while a band-wheel, H, on the opposite end of one of the roll-shafts gives motion to the rolls.

Doors I are arranged at each side of the lower casing by which to observe the condition of the meal.

One, two, or more sets of rolls and segments may be arranged for operation in the same frame.

The wheat or grain is discharged from the bottom of the machine and conducted to a sifting-machine to prepare it for regrinding through the same or a separate machine. This process of regrinding and sifting is ordinarily repeated several times, which will be determined by the judgment of the miller.

In the subsequent regrinding the rolls and segments may have finer grooves and cutting-edges. In this operation of retreating the product the particles of starch or flour are separated from the skin or bran with the least possible injury to the bran, so as not to discolor the flour. The middlings are then, finally, subjected to the purifying process of the crushing action of the porcelain rolls of smooth surfaces, as described in my said patents. A continuation of this process is repeated until all the flour is separated from the bran, and consequently the largest possible yield is obtained.

Any of the known means consisting of sieves, blast, or exhaust-machines may be used for purifying the coarse middlings produced in the process.

I am aware that the grinding-surfaces of millstones of the ordinary form have been made of porcelain, and that rolls and segments made of metal and other substances have been used for grinding grain and other materials; but the combination of grooved porcelain rolls with grooved porcelain segments adapted for adjustment at every point in relation to the rolls for grinding and granulating wheat gives the best advantages and results.

In referring to the porcelain roll and porcelain concave as forming grinding-surfaces, I do not mean to be understood as grinding the wheat into flour, but to granulate it into middlings, making the least possible flour during the operation of reduction. In such operation the grinding-roll and concave of porcelain or china are better, and produce better results and advantages, as already stated, than stone, quartz, cast or chilled iron, steel, and glass. The porcelain or china concave, however, must be firmly secured and supported at every point. It is, therefore, formed within a matrix or bed of suitable material adapted thereto and to the porcelain roll, so that said molded concave shall project beyond the holding matrix. Were it not for this construction a porcelain or china formed concave grooved grinding-surface could not be used with a roll-porcelain grinding-surface.

The porcelain or china concave is formed in the matrix while in a plastic condition, and the matrix serves the important purpose of holding the porcelain in the subsequent operations of properly truing and grooving its grinding-surface. The matrix is also formed with proper appliances, by which it is rendered a complete device for attachment and use in the machine in connection with adjusting devices.

Millstones with flat furrowed surfaces of porcelain have been proposed for grinding wheat into flour; but under such construction wheat cannot be reduced to middlings with little flour.

It is only by the use of porcelain that rolls and segments can be used with the best advantages and results for grinding and granulating wheat, because it has no unequal wear like all other material. It admits of forming the grooves and cutting-edges in any desired way, easily dressing and sharpening them by the use of black diamonds.

I claim—

1. In a wheat grinding and granulating machine, the means herein described of adjusting the bottom of the segmental porcelain surface in relation to the roll, consisting in pivoting said segment to the lower ends of arms pivoted to the frame above said segment pivots, the horizontal adjusting-lever $m$, interlocked with said arms below the axis-rod $n$ of said lever, and the regulating screw-stem $p$, substantially as described.

2. In a wheat grinding and granulating machine, the means herein described of adjusting the top of the segmental porcelain surface in relation to the roll, consisting in pivoting said segment at its lower side and interlocking its upper side with a hanging cross-bar, $r$, the lever $t$, extending therefrom, and the regulating screw-stem $u$, substantially as herein set forth.

3. The combination, with the segmental grooved porcelain surface and the side arms to which it is pivoted, as described, of the trunnion-blocks $i$ $i$, to which said arms are pivoted, and the adjusting screw-stems $i^3$, for moving said blocks to adjust one or both ends of said segment in relation to the roll, as described.

4. The segment having the porcelain grinding-surface and the arms $g$ $g$ pivoted to its lower corners and to the trunnion-blocks $i$ $i$ for adjustment, as described, in combination with the lever $m$, having thumbs interlocking with said arms, and controlled by a regulating-screw, $p$, the hanging bar $r$, interlocking with the upper side of said segment, and having the lever $t$ fixed thereto and controlled by the regulating-screw $u$, whereby to effect the adjustment of the segment in relation to the roll at every point.

5. The combination, with the segmental grooved porcelain surface adapted for adjustment, as described, in relation to the porcelain roll-surface, of the indicating device, consisting of the fixed scales and the pointer carried by the adjusting-levers $m$ and $t$, whereby to mark the distance of said segment from the roll at the top and at the bottom, substantially as herein set forth.

6. The matrix C, having the formed holding-bed for the porcelain or china concave P, the bottom side pivots $f$ $f$, and the top forked projections $s$ $s$, complete for use with supporting and adjusting devices, substantially as herein set forth.

In testimony that I claim the foregoing I have affixed my signature in the presence of two witnesses.

FEDERIGO WEGMANN.

Witnesses:
S. H. M. BYERS,
F. G. YETTEY.